April 26, 1932.  LA MAR BRESEE  1,855,621
DOOR FOR AUTOMOBILES
Filed March 19, 1930
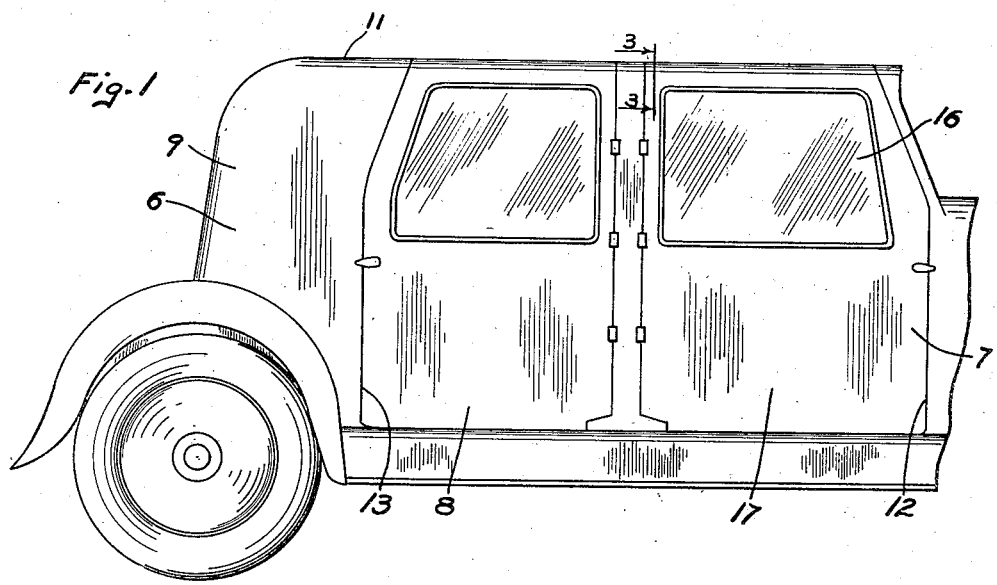
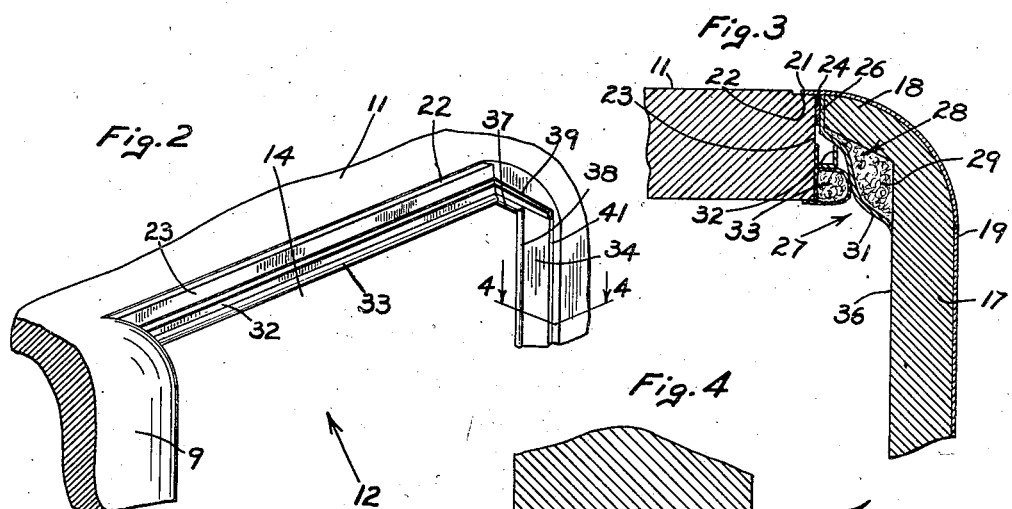
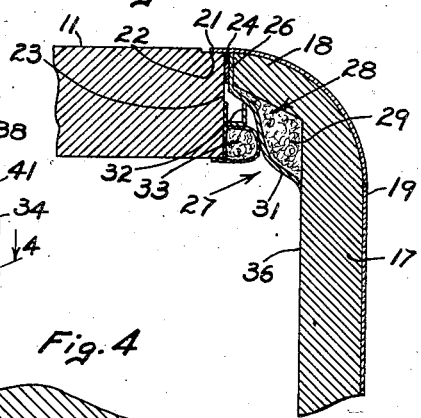
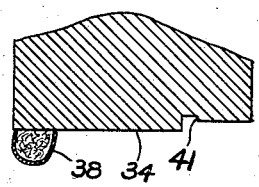
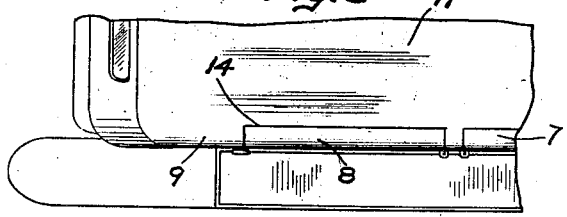
Inventor
La Mar Bresee
by Hazard and Miller
Attorneys Patented Apr. 26, 1932

1,855,621

UNITED STATES PATENT OFFICE

LA MAR BRESEE, OF PASADENA, CALIFORNIA, ASSIGNOR TO WALTER M. MURPHY MOTORS COMPANY, OF PASADENA, CALIFORNIA, A CORPORATION OF DELAWARE

DOOR FOR AUTOMOBILES

Application filed March 19, 1930. Serial No. 437,047.

This invention relates to vehicle bodies, and more especially to an improved type of door for vehicle bodies, of the type commonly employed upon closed automobiles.

An object of the invention is the provision of a door including a deflected portion extending angularly from the body portion of the door to close a complementary portion of the door-opening which extends into the roof of the vehicle.

A further object is to provide means for establishing a tight seal between the edges of the door and the edges of the door-opening, so as to prevent leakage therepast, into the interior of the vehicle.

Another object is to provide a gutter extending below the meeting edges of the door and roof, and arranged to deflect any liquid that leaks past the sealing means, so as to establish positive means for preventing the entrance of such leakage into the interior of the vehicle.

A still further object is to provide a resilient pad on the door, and/or on the wall and roof, arranged to establish a seal between the door and the rigid portion of the body, sufficiently tight to prevent drafts of air from entering the interior of the vehicle when the door is closed.

A further object is to provide draining means for conducting liquid from the gutter to a point suitable for the discharge thereof.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a side elevation of a portion of an automobile, the body of which is constructed in accordance with the principles of the present invention.

Fig. 2 is a perspective view of that portion of the automobile body adjacent the upper part of the door-opening, the door having been removed to better disclose the construction of the door jamb.

Fig. 3 is a vertical sectional view through the upper portion of the door and the roof of the vehicle body. The plane of section is indicated by the line 3—3 of Fig. 1, and the direction of view by the arrows.

Fig. 4 is a horizontal sectional view taken upon the line 4—4 of Fig. 2, with the direction of view as indicated.

Fig. 5 is a top plan view of a portion of the vehicle body, and showing the manner in which the deflected portion of the door cooperates with the roof in closing that portion of the door-opening which is within the roof.

The present day tendency in the construction of automobile bodies, is toward making them extremely low, particularly in the case of the heavier, more expensive vehicles. To such an extent has this tendency been developed that in the case of many automobile bodies, the roof of a closed car is so low that the door-openings are too small to permit entrance into and exit from the vehicle without inconvenience. The present invention contemplates a vehicle body construction in which each of the several door-openings is extended past the line of juncture of the wall and the roof, so that a portion of the door-opening extends into the roof itself. The door associated with such a door-opening, is provided with a deflected portion at the upper end thereof, complementary to that portion of the door-opening which is within the roof of the vehicle, with the result that even though the door opening has been made sufficiently large to permit facile entrance into, and exit from a vehicle in which the roof is exceedingly low, it is entirely possible to establish just as tight a seal between the door and the edges of its opening as in the case of the conventional door which is contained within a wall when the door is closed.

Specifically describing that embodiment of the invention which at present appears to be the most practical, I have shown my invention as having been applied to an automobile body indicated at 6, and provided with front and rear doors 7 and 8 respectively, hinged to a side wall 9 of the body 6. The body 6 also includes a roof 11 extending angularly from the wall 9, the wall 9 being preferably truly vertical and the roof 11 horizontal. A door-opening 12, 13, is formed in the wall 6 and each of the doors 7 and 8 respectively, but instead of being constructed in the conventional manner, each of these openings extends beyond the line of juncture of the wall 9 and the roof 11, so that a portion 14 of each door-opening 12, 13, lies within the roof 11.

Each of the doors 7, 8, which preferably is provided with a conventional window 16, comprises a body portion 17 and a top, deflected portion 18 extending angularly from the body portion 17, the angle between these two portions of the door 7 preferably coinciding with the angle between the wall 9 and the roof 11 of the vehicle body 6.

As it is customary to face the outer surface of a vehicle body and the doors thereof, with sheet metal such as that indicated at 19, it is convenient to extend the upper edge 21 of the sheet metal 19 beyond the edge of the deflected portion 18 of each door, and to form a complementary socket 22 in the roof 11 adjacent the edge 23 of the portion 14 of the door-opening—the parts being so proportioned and arranged that when the door is closed, the edge 21 serves as a flange seating within the socket 22 and extending past the engaging faces of the upper edge of the door and the door-opening. A gasket 24 of leather, rubber, felt or other suitable resilient material, is secured preferably to the edge 26 of the deflected portion 18 of each door, in position to engage the upper portion of the edge 23 of the door-opening, the purpose being to establish as nearly as tight a seal as is practical, between the edges 26 and 23 of the door and door-opening respectively.

The lower face of the deflected portion 18 of each door, is relieved to form a recess 27 which is disposed between the edge 23 of the door-opening and the deflected portion 18 of the door itself, when the door is closed. A portion of this recess is occupied by a pad 28 composed of a suitable, preferably resilient stuffing material 29, covered by upholstery 31 such as leather, mohair, or any suitable fabric.

Also lying within the recess 27 when the door is closed, is a gutter 32. This gutter is preferably formed of suitable non-corrosive metal, and is secured to the upper edge 23 of the door-opening extending longitudinally with respect to the vehicle body and disposed immediately below that portion of the edge 23 which is engaged by the gasket 26. Furthermore, the parts are so proportioned that when the door is closed, the upholstery 31 of the pad 28, presses resiliently against the upper outer edge of the gutter 32. The pad 28 also is adapted to press against the outer face of a pad 33 secured to the edge 23 of the door-opening below the gutter 32, and thus establish a seal between the upper edge of the door and the door-opening, sufficiently tight to prevent drafts of air therebetween. By constructing the pad 33 so that it protrudes farther toward the outside of the vehicle than the outer edge of the gutter 32, a protection will be offered tending to minimize the danger of injury to a person when entering a vehicle, by striking his head against the edge 23 of the door-opening. If the pad 33 is constructed in this manner, it will be the lowest and farthest protruding portion of the edge of the door-opening, and consequently, that portion thereof against which a person's head is most apt to be struck under such circumstances.

I prefer to extend the pad 33 downwards upon the sides 34 of the door-opening adjacent the inner face 36 of the vehicle body, and thus establish a draft-proof seal throughout at least the major portion of the entire periphery of the door. This extended portion of the pad 33 is indicated at 37 and 38, the portion 37 extending angularly outwards and downwards, and the portion 38 extending vertically downwards, as clearly shown upon Fig. 2.

The gutter 32 is also extended as indicated at 39, providing drains preferably at each end of the gutter 32, sloping downwards and outwards to a slot 41 formed in the vertical portion of the door jamb adjacent the outer faces of the door and wall 6. Preferably this slot extends all the way to the bottom of the door, so as to provide means for conducting any liquid entrapped within the gutter 32, to a point where it can not enter the interior of the body. As will be observed, the slot 41 is outside the vertical portion 38 of the pad 33, so that even in the event that the water is not completely confined within the slot 41, there will be no possibility of its entering the vehicle body. Suitable relieved portions in the side edges of the deflected portion 18 of the door 17, may be formed to accommodate the drains 39.

It is to be understood that the details of the invention as herein disclosed, are subject to alteration within the spirit or scope of the appended claims.

I claim:

1. In a vehicle body, a wall, a roof extending angularly therefrom, said wall and roof having an opening therein extending on both sides of the line of juncture thereof and forming a stationary frame around said opening, and a closure swinging on a vertical axis and complementary to said opening.

2. In a vehicle body, a wall, a roof extending angularly therefrom, said wall and roof having an opening therein extending on both sides of the line of juncture thereof and forming a stationary frame around said opening, and a closure swinging on a vertical axis and complementary to said opening, the upper portion of said closure being deflected from the body thereof and receivable within said portion of the opening within the roof when the closure is closed.

3. In a vehicle body, a wall, a roof extending angularly therefrom, said wall and roof having an opening therein extending on both sides of the line of juncture thereof, a closure complementary to said opening and hingedly mounted therein, means interposed between said closure and the edge of said opening to prevent drafts therepast, and means for preventing seepage of liquid into said body between said closure and the edge of said opening.

4. In a vehicle body, a wall, a roof extending angularly therefrom, said wall and roof having an opening therein extending on both sides of the line of juncture thereof, a closure hinged to said wall to optionally open or close said opening, the upper portion of said closure being deflected from the body thereof and receivable within that portion of the opening within the roof when the closure is closed, a gasket interposed between the top edge of said closure and the top edge of said opening, and drain means cooperative with said gasket for preventing seepage of liquid between said closure and the edge of said opening.

5. In a vehicle body, a wall, a roof extending angularly therefrom, said wall and roof having an opening therein extending on both sides of the line of juncture thereof, a closure hinged to said wall to optionally open or close said opening, the upper portion of said closure being deflected from the body thereof and receivable within that portion of the opening within the roof when the closure is closed, a gasket interposed between the top edge of said closure and the top edge of said opening, and a gutter extending below said gasket to deflect leakage therepast from the interior of said vehicle.

6. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, and a gutter extending below the edges of said door and opening within the roof when the door is closed.

7. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, the under part of said deflected portion being relieved to form a recess between the edges of the opening and the door within the roof when the door is closed, and a gutter secured to the edge of said opening in register with said recess.

8. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, the under part of said deflected portion being relieved to form a recess between the edges of the opening and the door within the roof when the door is closed, a gutter secured to the edge of said opening in register with said recess, and a drain communicating with said gutter at an end thereof and leading to a position between said door and wall adjacent their outer faces.

9. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, the under part of said deflected portion being relieved to form a recess between the edges of the opening and the door within the roof when the door is closed, a gutter secured to the edge of said opening in register with said recess, and a pad secured to said door within said recess in position to press against the outer edge of said gutter when the door is closed.

10. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, the under part of said deflected portion being relieved to form a recess between the edges of the opening and the door within the roof when the door is closed, a gutter secured to the edge of said opening in register with said recess, a pad secured to the edge of said opening below said gutter, and a pad secured to said door within said recess in position to press against the outer edge of said gutter and against the pad on the edge of the opening when the door is closed.

11. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, the under part of said deflected portion being relieved to form a recess between the edges of the opening and the door within the roof when the door is closed, a gutter secured to the edge of said opening in register with said recess, a pad secured to the edge of said opening below said gutter, a pad secured to said door within said recess in position to press against the outer edge of said gutter and against the pad on the edge of the opening when the door is closed, and a gasket secured to the edge of said deflected portion of the door in position to press against the edge of said opening above said gutter when the door is closed.

12. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, the under part of said deflected portion being relieved to form a recess between the edges of the opening and the door within the roof when the door is closed, a gutter secured to the edge of said opening in register with said recess, a pad secured to the edge of said opening below said gutter, a pad secured to said door within said recess in position to press against the outer edge of said gutter and against the pad on the edge of the opening when the door is closed, a gasket secured to the edge of said deflected portion of the door in position to press against the edge of said opening above said gutter when the door is closed, and a drain communicating with said gutter at an end thereof and leading to a position between said door and wall adjacent their outer faces.

13. In a vehicle body, a wall, a roof extending angularly therefrom, said wall and roof having an opening therein extending on both sides of the line of juncture thereof, a door hinged to said wall and comprising a body portion complementary to that portion of the opening within said wall and a deflected top portion complementary to that portion of the opening within the roof, the under part of said deflected portion being relieved to form a recess between the edges of the opening and the door within the roof when the door is closed, a gutter secured to the edge of said opening in register with said recess, a pad secured to the edge of said opening below said gutter, a pad secured to said door within said recess in position to press against the outer edge of said gutter and against the pad on the edge of the opening when the door is closed, a gasket secured to the edge of said deflected portion of the door in position to press against the edge of said opening above said gutter when the door is closed, and a drain communicating with said gutter at an end thereof and leading to a groove in a side edge of said opening adjacent the outer face of said wall, said groove leading downwards toward the bottom of said opening.

In testimony whereof I have signed my name to this specification.

LA MAR BRESEE.